United States Patent [19]

Kowall et al.

[11] Patent Number: 5,581,947

[45] Date of Patent: Dec. 10, 1996

[54] VEHICLE DOOR ASSEMBLY

[75] Inventors: David J. Kowall, Hartland; Delbert D. DeRees, Romeo, both of Mich.

[73] Assignee: Chrysler Corporation, Auburn Hills, Mich.

[21] Appl. No.: 486,129

[22] Filed: Jun. 7, 1995

[51] Int. Cl.[6] .................................................. E05F 1/00
[52] U.S. Cl. .................................................. 49/451; 49/502
[58] Field of Search ........................... 49/502, 449, 450, 49/451; 296/146.5, 146.7

[56] References Cited

U.S. PATENT DOCUMENTS

| | | |
|---|---|---|
| 606,484 | 6/1898 | Greife . |
| 1,018,427 | 2/1912 | Killingsworth . |
| 1,420,932 | 6/1922 | Langeberg . |
| 1,492,576 | 5/1924 | Nicholson . |
| 1,522,183 | 1/1925 | Haarnagell . |
| 1,642,162 | 9/1927 | Londick . |
| 1,773,751 | 8/1930 | Reidhaar . |
| 2,261,482 | 11/1941 | Myers . |
| 3,264,032 | 8/1966 | Smith . |
| 4,502,248 | 3/1985 | Thomas et al. ............ 49/450 X |
| 4,503,639 | 3/1985 | Rossie et al. . |
| 4,571,888 | 2/1986 | Jensen . |
| 5,038,519 | 8/1991 | Huebner . |

FOREIGN PATENT DOCUMENTS 13852   4/1956   Germany .................................. 49/451

*Primary Examiner*—Kenneth J. Dorner
*Assistant Examiner*—Jerry Redman
*Attorney, Agent, or Firm*—Thomas G. Pasternak

[57] ABSTRACT

A light-weight vehicle door including, in one form, outer and inner plastic panels bonded together with the inner panel molded with upright forward, aft and intermediate frame portions. The forward and aft frame portions providing opposed side walls formed with L-section mirror image window panel supporting rebates including co-planar fore and aft reveal flanges and parallel opposed fence flanges. An inverted U-shaped trim member having vertically extending leg sections with each leg section received in an associated rebate and defining, with a respective fence flange, opposed guide grooves slidably supporting a window panel. A manual window panel regulating mechanism mounted on a lower edge of the window panel having a regulator adapted for cooperative locking engagement with an intermediate frame portion holding the window panel in a partially or fully raised position.

12 Claims, 4 Drawing Sheets

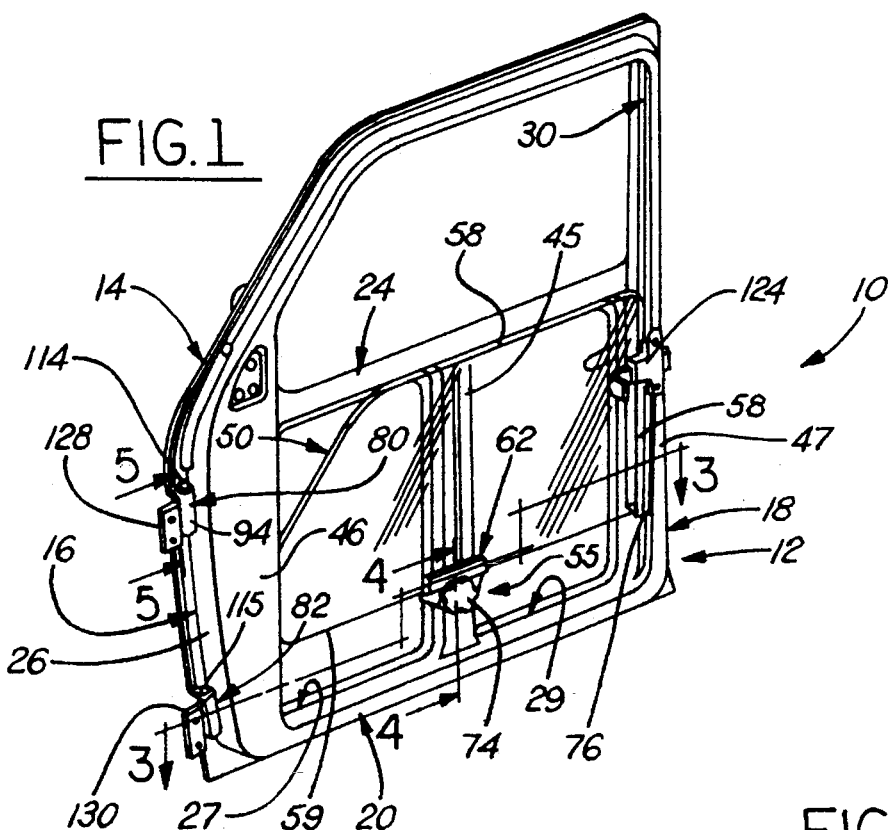
FIG. 1
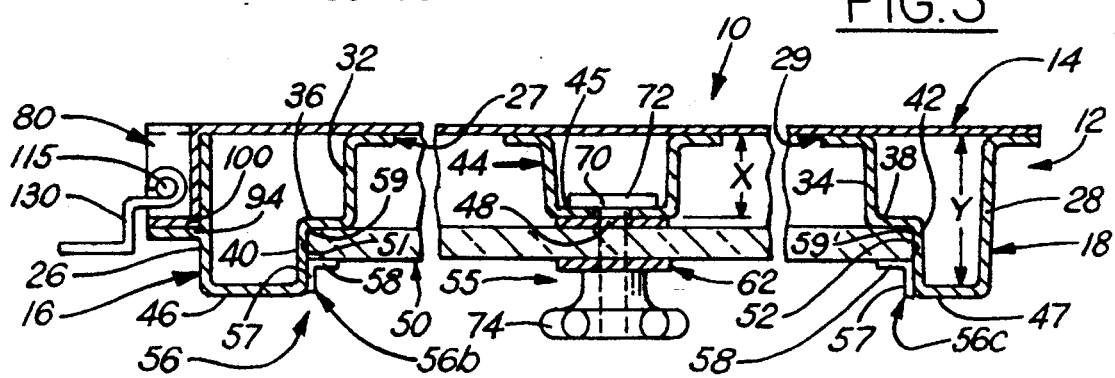
FIG. 3
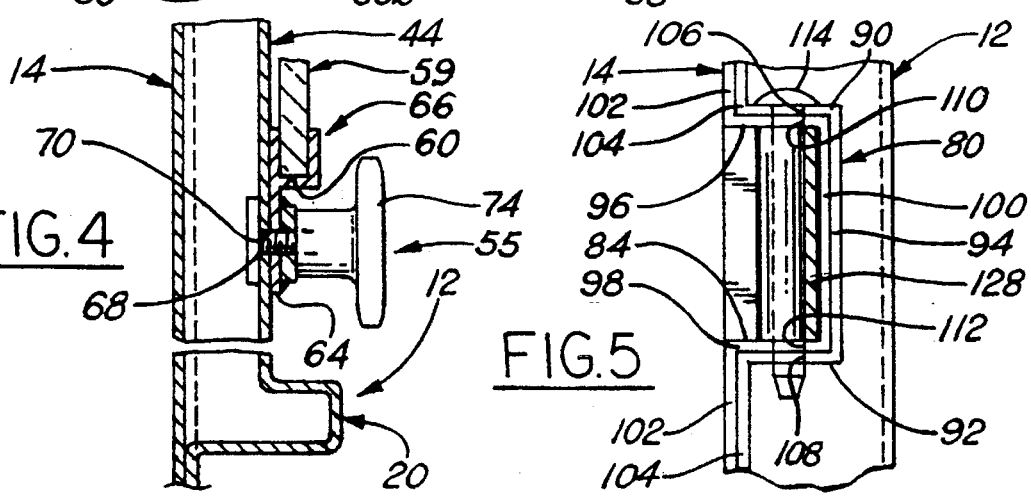
FIG. 4
FIG. 5

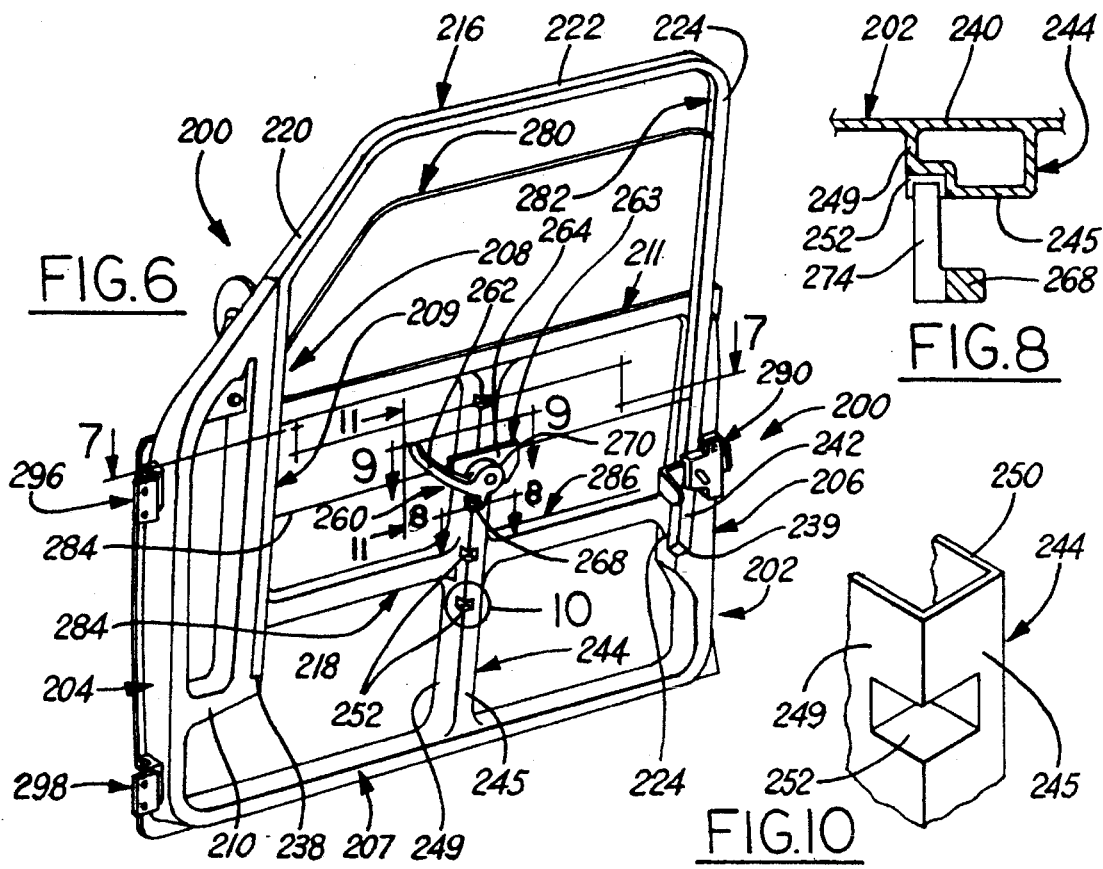
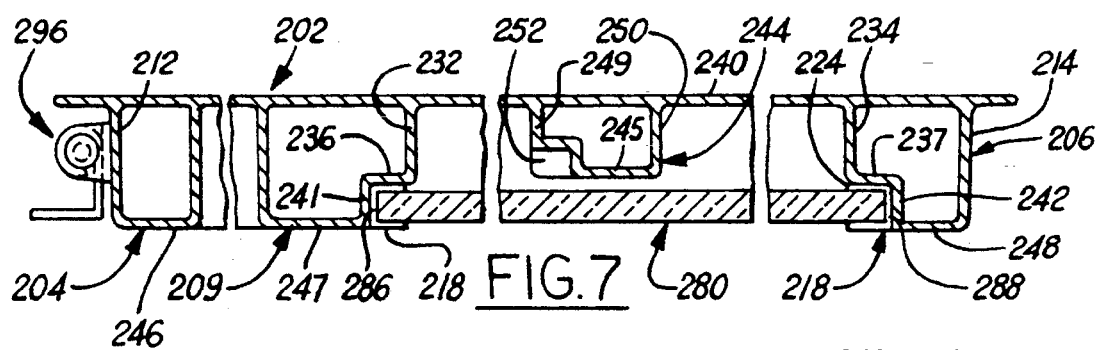
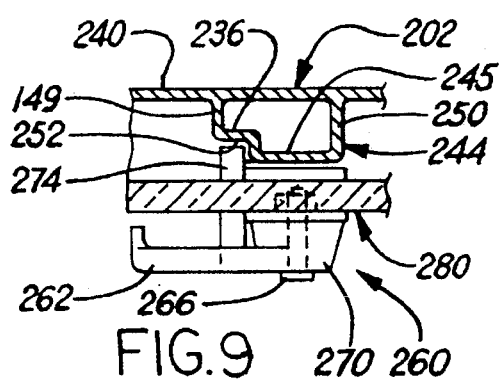
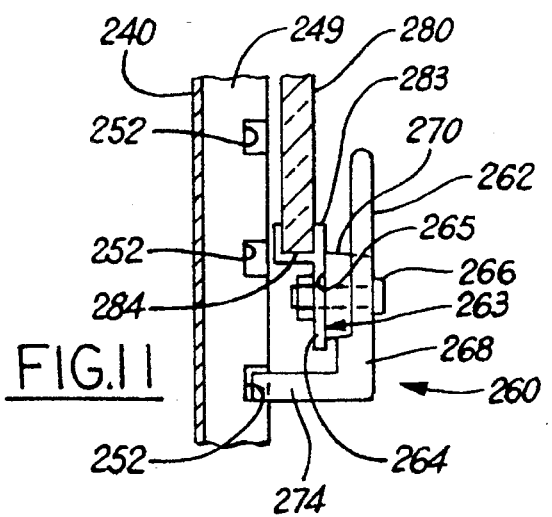

VEHICLE DOOR ASSEMBLY

BACKGROUND OF THE INVENTION

This invention relates to door assemblies for automotive vehicle bodies and more particularly to vehicle doors of plastic material which are light in weight incorporating manually operable window regulator mechanisms.

Conventional vehicle doors have been generally constructed on an element by element basis requiring a sequence of operations during an assembly line process. The main door unit usually comprises a thin metal stamping forming an inner panel while an outer panel is hemmed around the marginal edges of the inner panel. The automotive industry is continually trying to design light weight door structures that provide high volume economic production together with good stiffness-to-weight ratios. In the case of light weight utility vehicles, an important feature in reducing door weight involves the use of manually operable widow regulator arrangements without counterbalancing hardware.

U.S. Pat. No. 4,662,115 issued May 5, 1987, to Ohya is an example of a vehicle door structure comprising an outer panel of synthetic resin and an inner panel of steel plate. In the Ohya patent, a door hinge and a door lock device are mounted on the steel inner panel.

U.S. Pat. No. 3,264,032 issued Aug. 2, 1966, to R. P. Smith discloses a manually operable spring loaded detent vehicle window regulator. A handle controls the detent allowing it to engage any one of a series of ratchet teeth carried on a guide member to hold a vehicle window at a selected elevated position. The weight of the window is manually supported by the operating handle during raising and lowering movements of the window.

SUMMARY OF THE INVENTION

It is a feature of the present invention to provide a light weight vehicle door of plastic panel construction incorporating a manually operable regulating mechanism mounted on the window panel for holding the window panel in partially or fully raised positions.

It is another feature of the present invention to provide a light weight vehicle door including a plastic panel having an inner surface molded with first and second upright frame portions formed with opposed spaced apart rebates adapted to support associated first and second vertically disposed leg sections of an inverted U-shaped window panel guide member.

It is a further feature of the present invention to provide a plastic door panel as set forth above that includes an intermediate upstanding frame portion whereby, upon manual rotation of a regulating member of the window regulator mechanism, the regulating member engages the intermediate frame member thereby holding the window panel in partially or fully raised positions.

It is still another feature of the present invention to provide a low cost light weight utility vehicle door including a single piece molded plastic lower panel and an upper inverted U-shaped metal window frame of channel section, wherein the frame has parallel first and second leg sections joined by a bight section. The panel is molded with first and second upright frame portions having opposed side walls formed with vertically extending L-section rebates, whereby each rebate is adapted to support, in a conforming manner, an associated window frame leg section.

It is a further feature of the present invention to provide a light weight utility vehicle door of plastic panel construction wherein the rebates define vertically extending mirror image first and second co-planer reveal flanges and opposed first and second parallel fence flanges adapted to form, together with a trim member, window panel first and second guide grooves wherein each window panel side edge is slidable in an associated groove.

It is still another feature of the present invention to provide a utility vehicle door of plastic panel construction wherein the door includes inner and outer plastic panels bonded together with each panel having integrally molded upper and lower door-half hinge pockets for complementary nested engagement, wherein each composite hinge pocket receives a body-half hinge therein for pivotal connection thereto by a hinge pin.

In a first embodiment of the present invention, a window panel is manually raised and lowered by a window regulating mechanism mounted by a bracket secured to the bottom edge of the window panel. A door panel intermediate upstanding frame portion is formed with a vertically extending keyway terminating at its lower end in an entry keyslot. An operating knob is threaded on a T-stud with its T-end slidably retained in the keyway. Upon loosening the knob, the window panel is adapted to be raised or lowered. Tightening the knob retains the window panel at any partially or fully raised position.

In accordance with a second embodiment of the present invention, a window regulating mechanism includes a spring biased rotatable operating handle pivotally secured to a bracket mounted on the window panel lower edge. A series of vertically spaced notches are formed in the door panel intermediate frame portion. The operating handle is biased in one direction so as to retain a handle lug locking finger in a selected one of the notches providing step-wise partially or fully raised locked positions of the window panel.

These and other objects, features and advantages of the invention will be more fully understood from the following detailed description of the invention taken together with the accompanying drawings.

BRIEF DESCRIPTION OF THE DRAWINGS

In the drawings:

FIG. 1 is a perspective view of an assembled vehicle door in accordance with a first embodiment the present invention;

FIG. 3 is a horizontal cross-sectional view taken on the line 3—3 of FIG. 1;

FIG. 4 is a fragmentary vertical-sectional view taken on the line 4—4 of FIG. 1, illustrating a construction incorporating the invention;

FIG. 5 is a fragmentary vertical sectional view taken on the line 5—5 of FIG. 1;

FIG. 6 is a perspective view of an assembled vehicle door in accordance with a second embodiment of the invention;

FIG. 7 is a horizontal sectional view, with parts broken away, taken on the line 7—7 of FIG. 6; FIG. 8 is an enlarged fragmentary horizontal sectional view taken on the line 8—8 of FIG. 6;

FIG. 9 is an enlarged fragmentary horizontal sectional view taken on the line 9—9 of FIG. 6;

FIG. 10 is an enlarged fragmentary perspective view of the portion of FIG. 6 within the circle denoted "10";

FIG. 11 is an enlarged fragmentary vertical sectional view taken on the line 11—11 of FIG. 6.

DETAILED DESCRIPTION OF THE INVENTION

Figure 2:
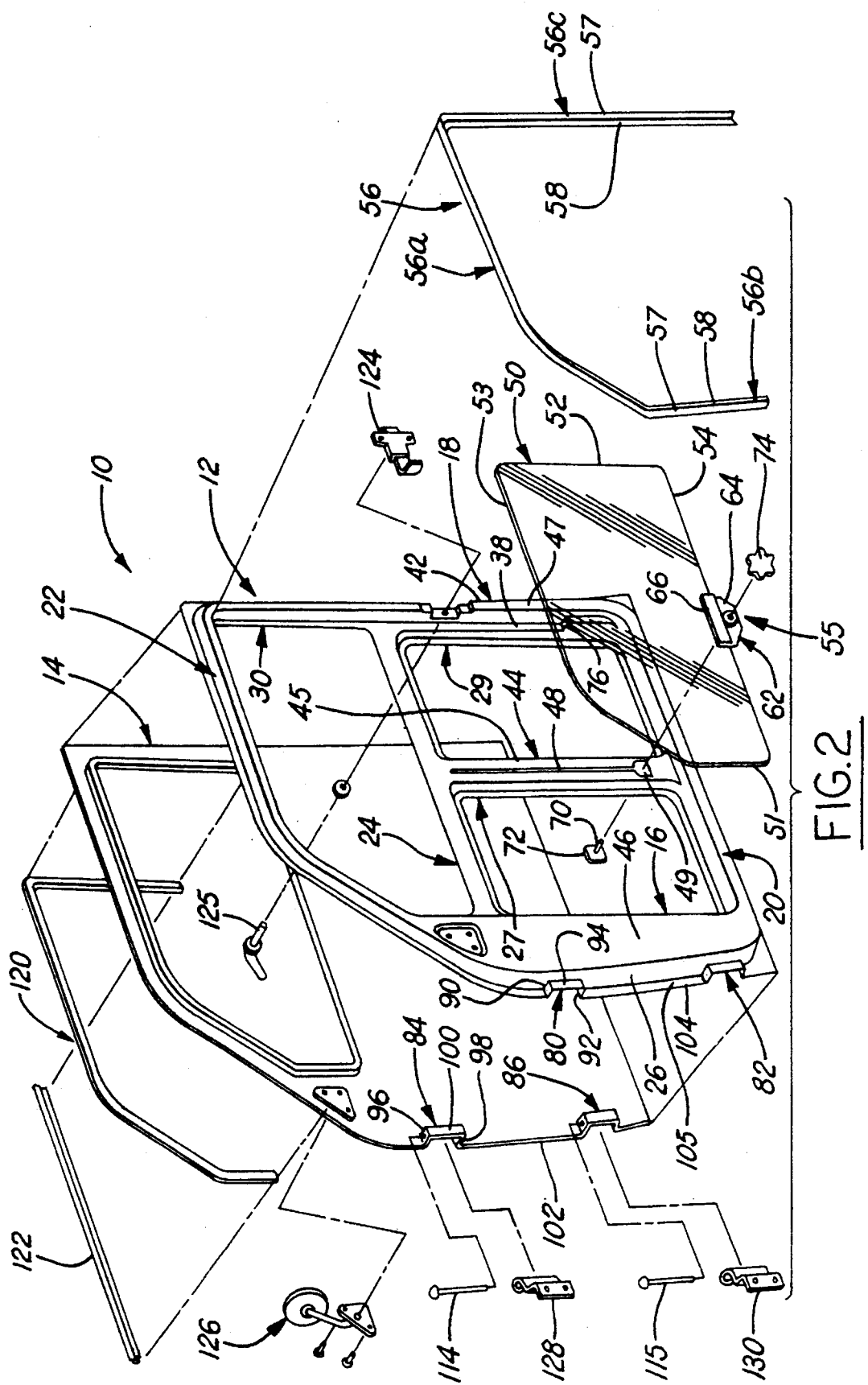
FIG. 2 is an exploded perspective view of the vehicle door shown in FIG. 1.

Referring now to the drawings, FIG. 1 is a perspective view of a first embodiment vehicle door structure, generally indicated at 10. The door structure 10 of the present invention is of double wall construction including an inner panel 12 and an outer panel 14 molded of engineering plastic resins, such as polycarbonate structural foam plastics. With reference to the exploded perspective view of FIG. 2, it will be seen that the inner panel 12 is integrally formed with first and second upright U-section frame portions 16 and 18 respectively. Each upright frame portion extends from a lower end to an upper end whereby an inner panel lower frame portion 20 connects the lower ends of the first and second frame portions 16 and 18 while an upper frame portion 22 connects their upper ends.

An inner panel horizontal waist frame portion 24 is shown connecting intermediate portions of the upright frame portions 16 and 18. It will be seen in FIG. 3 that the first and second frame portions 16 and 18 provide opposite facing side walls defining a hinge face on forward side wall 26 and a shut face on aft side wall 28. The first and second upright frame portions 16 and 18 together with the waist frame portion 24 and the upper frame portion 22 define an integral window frame opening 30 of the door. FIG. 2 shows the lower half of the inner panel defining first and second rectangular-shaped openings, indicated generally at 27 and 29, respectively, reducing the door weight.

The inner panel first and second frame portions 16 and 18 define opposed vertically extending side walls 32 and 34 respectively, having their inboard ends formed with mirror image first and second L-section window panel rebates. The rebates include co-planar first 36 and second 38 vertically extending shoulder-like reveal flanges, which are offset a predetermined dimension outboard from the outer door panel 14. The rebates also include first and second parallel opposed fence flanges 40 and 42 longitudinally spaced apart a predetermined dimension.

With reference to FIG. 2, an inner panel upstanding intermediate frame portion 44 extends from a lower end to an upper end connecting the lower frame portion 20 and the waist frame portion 24. FIG. 3 shows the intermediate frame portion 44 having an inner wall 45 positioned inboard from outer door panel 14 a predetermined dimension "X" which is about one-half predetermined dimension "Y" that first and second frame portion inboard co-planar inner walls 46 and 47 are positioned from the outer door panel 14. The intermediate frame portion inner wall 45 is formed with a vertically extending keyway 48, together with an entry keyslot 49 provided at the keyway lower end.

A window panel 50 for the door is shown in FIG. 2 having vertical first and second side edges 51 and 52 and upper and lower edges 53 and 54, respectively. It will be noted that the window panel 50 may be formed either of glass or transparent plastic, such as polyvinyl chloride (PVC) plastic for example.

Further referring to FIG. 1, a manual window regulating mechanism, generally indicated at 55, is adapted for holding the window panel 50 in selective partially or fully raised positions. FIG. 2 shows an inverted U-shaped window framing inner trim member 56 comprising a bight section 56a and parallel first and second depending leg sections 56b and 56c, respectively, supported in respective first and second frame portion rebates. The trim member 56 has a right angle section defining a foot flange 57 and a normal flange 58 adapted for flush contact with an inboard surface of the glass panel. With reference to FIG. 3, the trim member foot flange 57 is suitably secured, as by a plurality of fasteners, to the fence flanges 40 and 42. The leg flange 58 is positioned in parallel spaced relation with an associated first and second reveal flange 36 and 38 defining first and second guide grooves 59 and 59'. Thus, as seen in FIG. 3, the vertically extending grooves are longitudinally spaced a predetermined dimension and adapted to slidably receive an associated vertical side edge 51 and 52 of the window panel.

The manual window regulating mechanism 55 shown in FIG. 4 includes a bracket 62 having a vertically disposed inboard body plate 64 provided with an upper longitudinally extending U-section channel 66. The channel 66 provides an upwardly opening groove, fixedly retaining therein, the lower edge 54 of the window panel 50. The bracket body plate 64 has a clearance hole 68 receiving therethrough a regulator comprising a threaded stud 70 with its inboard end received in the intermediate frame portion keyway 48. The stud has a keyway follower, in the form of a T-member 72, fixed on the outboard end, and an operating adjustment knob 74, threaded on its inboard end.

As seen in FIG. 3, threadably loosening the knob 74 allows each window panel side edge to slide in associated first and second guide grooves 59 and 59', respectively. Upon tightening the knob 74, the window panel may be selectively held in partially or fully raised positions. It will be seen in FIG. 2 that the second rebate, defined by reveal flange 38 and fence flange 42, has a molded-in lower stop face 76 which, together with a first rebate stop face (not shown), horizontally positions the window panel lower edge 54 thereon defining its fully lowered position.

Referring to FIG. 2, it will be seen that the inner panel 12 is formed with upper and a lower rectangular-shaped vertically elongated hinge pockets 80 and 82, respectively, while the outer panel 14 is formed with matching upper and lower hinge pockets 84 and 86. The upper and lower inboard projecting hinge pockets 80 and 82, respectively of the inner panel 12 are adapted for nested conforming reception therein with associated complementary shaped outer panel upper and lower hinge pockets 84 and 86, respectively.

With reference to FIG. 5, the upper hinge pocket 80 of the inner panel 12 comprises a pair of upper and lower horizontal end walls 90 and 92 and a vertical side wall 94 interconnecting the end walls are positioned in flush contact with associated upper and lower end walls 96 and 98 and side wall 100 of the outer panel upper pocket 84. It will be appreciated that, upon the outer panel upper and lower hinge pockets 84 and 86 being nested and suitably secured within their associated inner panel upper and lower hinge pockets 80 and 82, the inner 12 and outer 14 panels are interlocked in a rigid manner. As seen in FIG. 2, the outer panel 14 has its first edge 102 adapted for flush alignment with outer panel first edge 104 of its first flange 105.

With the door panels 12 and 14 assembled, the inner panel upper hinge pocket 80 has an upper end wall hole 106 and a lower end wall hole 108 aligned with the outer panel hinge pocket 84 upper end wall hole 110 and lower end wall hole 112. Upon an upper hinge pin 114 being received through the aligned hinge pocket holes 106, 110, 112, and 108, the door panels are pivotally interlocked with upper body-half hinge 128. It will be appreciated that a lower hinge pin 115 pivotally interlocks lower body-half hinge 130 the inner panel lower hinge pocket 82 and the outer panel lower hinge pocket 86 in an identical manner.

As seen in FIG. 2, an outboard inverted U-shaped window frame trim member 120, together with a lower waist strip 122, is adapted to border the window frame opening 30 on its outboard side. Suitable door hardware, in the form of door latch assembly 124, exterior latch operating handle 125, exterior mirror assembly 126, and upper 128 and lower 130 door-half hinges are provided to complete the door structure.

Referring now to a second embodiment of the invention, disclosed in FIGS. 6–11, FIG. 6 shows a perspective view of a two-piece door structure, generally indicated at 200, comprising a lower plastic door panel 202 and an upper metal inverted U-shaped window panel frame 216. The door structure lower panel 202 is molded of suitable engineering plastic resins or the like and has a generally rectangular shape including first and second upright box-section frame portions 204 and 206 respectively. Each first and second frame portion 204 and 206 extends from a lower end to an upper end whereby a lower horizontal frame portion 207 connects the lower ends of the frame portions 204 and 206.

As seen in FIG. 6, the door structure further includes a doubler frame portion 208, having a generally L-shape, located just second of the first frame portion 204. The doubler frame portion 208 comprises an upstanding leg portion 209, having an upper end and a lower firstly extending foot portion 210 joined at its first end to the front frame portion 204. An upper horizontal waist frame portion 211, shown with its first end joined to an intermediate location on the doubler frame leg portion 209, has its second end joined to the second frame portion upper end. The first frame portion 204 has a first hinge face wall 212 while the second frame portion 106 has an opposite second shut face wall 214.

Referring to FIG. 7, it will be seen that the door structure upper window panel inverted U-shaped frame 216 has a channel section and includes a first vertical column-like leg section 218 terminating in an upwardly and rearwardly inclined section 220, a horizontal bight section 222, and an second vertical column-like leg section 224.

As seen in FIG. 7, the doubler frame portion upright leg 209 and the second frame portion 206 define opposed vertically extending side walls 232 and 234, respectively, having their inboard ends formed with mirror image right angle L-section window panel rebates including co-planar first and second reveal flanges 236 and 237, respectively. It will be noted that the reveal flanges 236 and 237 are offset a predetermined dimension inboard from planar exterior panel portion 240 of the door panel 202. The first and second L-sectioned rebates further include first 241 and second 242 parallel vertically disposed fence flanges spaced apart a predetermined dimension.

Figure 12:
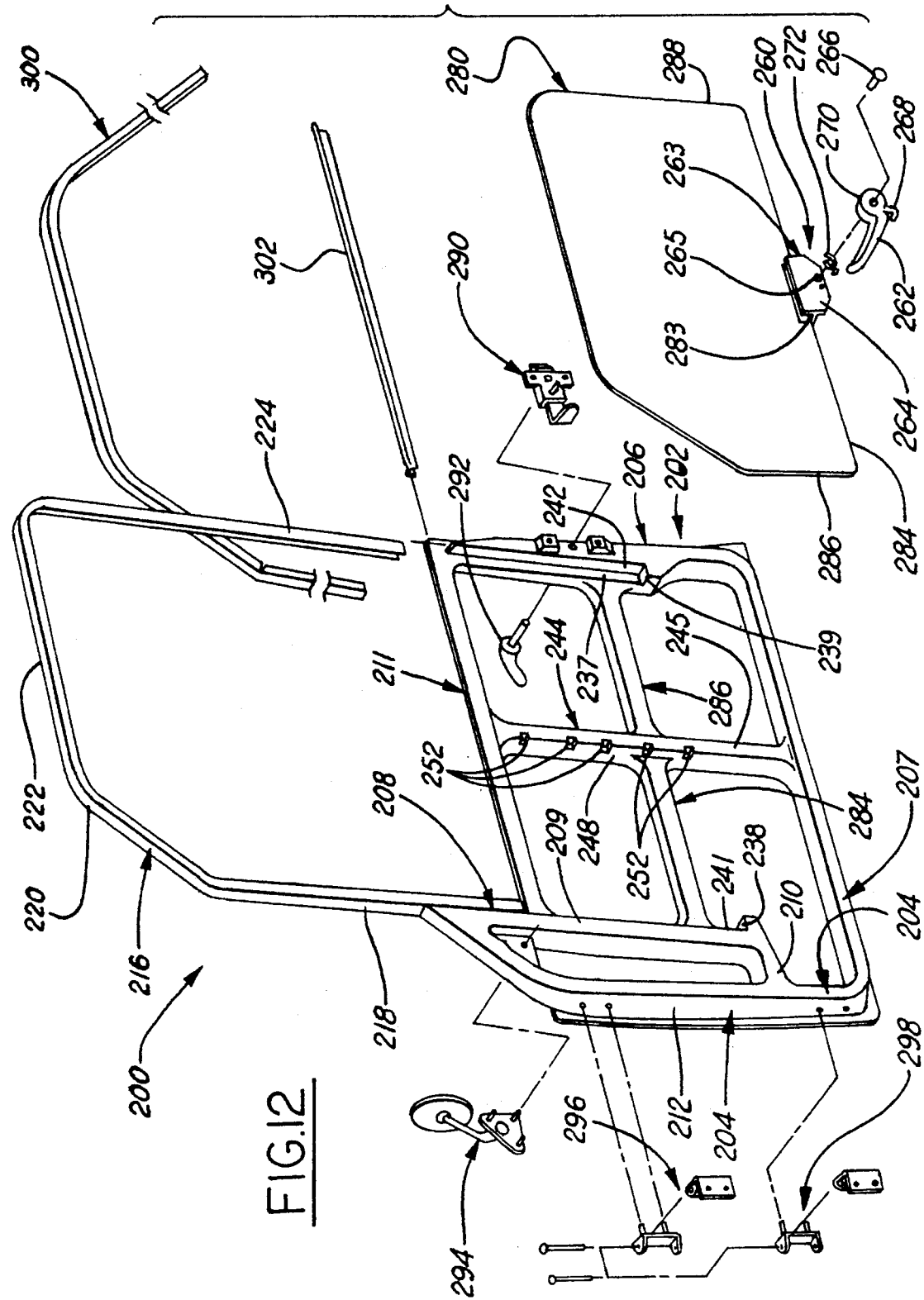
FIG. 12 is an exploded perspective view of the vehicle door shown in FIG. 6.

Referring to FIG. 12, the doubler frame portion first rebate is shown terminating in a molded-in lower end stop face 238 while a corresponding lower end stop face 239 is provided in the second frame portion rebate. The stop faces 238 and 239 define seats for the lower end of their associated upper frame member first and second leg sections 218 and 224.

It will be observed in FIGS. 6 and 7 that the door lower-half panel 202 is formed with an upstanding intermediate frame portion 244 which extends from a lower end to an upper end, connecting the lower frame portion 207 and the waist frame portion 211. The intermediate frame portion 244 has an inner wall 245 positioned inboard a predetermined dimension from the door panel 240 about one-half the inboard dimension of the co-planar frame portion inner walls 246, 247 and 248 from the outer door panel portion 240. The intermediate frame portion 244 has a generally box-shaped cross section defining a first wall 249 and an second wall 250, wherein the juncture of its first and inner walls 249 and 245 define a series of vertically spaced locking recesses 252 (FIG. 10).

With reference to FIG. 11, it will be seen that a window panel regulating mechanism, generally indicated at 260, comprises a window regulator in the form of an operating handle 262 pivotally connected to a mounting bracket 263. The bracket 263 has a vertically disposed inboard mounting plate 264 provided with a central bore 265 adapted to receive therein a pivot bolt 266. The pivot bolt 266 pivotally mounts the operating handle 262 on the bracket 263 for rotation about the transverse pivot axis of the bolt 266. The operating handle 262 is formed with a depending angle-shaped latching lug 268 extending downwardly from a handle hub portion 270. A torsion spring 272 is positioned on the pivot bolt 266 and is adapted to bias the operating handle 262 in a counterclockwise direction, as viewed in FIG. 6. The torsion spring biases an outboard extending finger 274 of the latching lug 268 against the first side wall 249 of the intermediate frame portion 244.

The mounting bracket 263 is formed with an upper horizontally disposed upwardly opening channel 283 adapted to retain therein lower edge 284 of the window panel 280. With reference to FIG. 7, window panel 280 is shown with its first and second vertical edges 286 and 288 received in associated first and second channel-section guide portions of the upper frame leg sections 218 and 224. The vertically disposed leg sections are longitudinally spaced apart a predetermined dimension providing opposed open guide channels adapted to slidably receive an associated vertical side edge 286 and 288 of the window panel 280. FIG. 7 shows the first and second leg sections 218 and 224 supported in flush contact with their associated first and second reveal flanges 236 and 237 and first and second fence flanges 241 and 242.

Referring to FIG. 9, it will be seen that the locking lug inboard finger 274 is adapted for biased engagement with an associated locking recess 252. The regulator assembly allows the window panel 280 to be manually moved to a plurality of partially raised positions, or a fully raised position, closing the window opening 282. Thus, the operator may readily position the window panel 280 up or down, by pivoting the operating handle 262 clockwise, to rotate the lug finger 274 free of its associated recess 252. It will be noted that, to selectively adjust the window panel to its next adjacent raised or lowered position, the operator may release the handle 262 allowing the lug finger 274 to be spring biased into sliding contact with the intermediate frame portion side wall 249. Upon the finger reaching the next adjacent recess 252, the handle torsion spring 272 urges the finger 274 into locking engagement with the selected recess.

It will be observed in FIG. 12 that the lower-half door panel 202 is formed with a pair of horizontally disposed intermediate first and second frame cross portions 284 and 286. The cross portions 284 and 286 provide additional door panel rigidity and strength to support the L-shaped doubler frame portion 209 together with the lower ends of the column sections 218 and 224.

As seen in FIG. 12, suitable door hardware such as latch assembly 290, exterior latch operating handle 292, exterior mirror assembly 294, and upper and lower hinge assemblies 296 and 298 respectively, are provided to complete the door structure. Further, FIG. 12 shows an inverted U-shaped window frame trim member 300 adapted to border the window frame opening 282 on its outboard side together with a lower waist trim strip 302.

Although the invention has been described by reference to two specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A door structure for a vehicle comprising:

a door panel of plastic material integrally formed with first and second upright frame portions and an intermediate upright frame portion, said first and second frame portions projecting inboard further than said intermediate frame portion and having opposed side walls formed with vertically disposed first and second L-section rebates, said rebates defining co-planar reveal flanges and opposed parallel fence flanges spaced apart;

an inverted U-shaped window retaining member comprising a bight section and first and second vertically extending leg sections, each said leg section having a first flange spaced inboard from an associated reveal flange and a second flange extending at a right angle from said first flange secured to an associated fence flange, each said first flange cooperating with its associated reveal flange for slidable retention of a window panel on said door panel; and a manual window panel regulating mechanism comprising a bracket mounted on a lower edge of said window panel, said bracket rotationally supporting a window panel regulator having an inboard operating end and an outboard window panel locking end adapted for engagement with said intermediate frame portion;

whereby upon rotation of said operating end in one direction, engages said locking end and holds said window in a partially or fully raised position, and whereby upon rotation of said operating end in an opposite direction, disengages said locking end and releases said window panel for slidable positioning on said door panel.

2. The door structure as set forth in claim 1 wherein said first, second, and intermediate frame portions have a U-section, said first and second frame portions define co-planar inner walls and said intermediate frame portion defines an inner wall positioned outboard further than said first and second frame portion inner walls, said intermediate frame portion inner wall having a vertically extending keyway therein, said regulator comprising a stud extending through a bracket body hole and said keyway, a follower on said stud outboard end and an operating knob threaded on said stud inboard end, whereby threadably tightening said knob locks the window panel in partially or fully raised positions, and whereby upon threadably loosening said knob allows selective movement of said window panel.

3. The door structure as set forth in claim 1 wherein said first, second, and intermediate frame portions having a U-section, said first and second frame portions define co-planar inner walls and said intermediate frame portion defines an inner wall positioned outboard from said first and second inner walls, said intermediate frame portion having first and second side walls wherein the juncture of said intermediate frame portion inner wall and first side wall is formed with a series of vertically spaced locking recesses, said regulator comprising a spring biased operating handle pivotally supported on said bracket by a pivot fastener, said handle having a locking lug extending downwardly therefrom, said spring biasing means adapted for rotational biasing said handle locking lug in a first direction, such that said lug is sized for biased locked reception in one of said intermediate panel locking recesses holding said window panel in a selected partially of fully raised positions.

4. The door structure as set forth in claim 1 wherein said U-shaped window retaining member has a right angle section.

5. The door structure as set forth in claim 1 wherein said U-shaped window retaining member has a channel-shaped section.

6. The door structure as set forth in claim 1 wherein said window panel is formed of transparent plastic.

7. The door structure as set forth in claim 1 wherein said window panel is formed of glass.

8. The door structure as set forth in claim 1 wherein each said rebate terminates at its lower end in a horizontally disposed stop face adapted to seat a lower end of its associated U-shaped window retaining member first and second leg section and a lower edge of said window panel in its fully lowered position.

9. The door structure as set forth in claim 1 wherein and said door panel is in the form of an inner panel secured to a planer outer panel, said inner panel first and second frame portions having opposite vertically disposed hinge and shut faces, said hinge face is offset rearwardly from a vertically extending inner panel first edge defining a first edge flange, said edge flange is molded with upper and lower rectangular-shaped inboard projecting hinge pockets;

said outer panel having a first vertical edge portion molded with upper and lower rectangular-shaped inboard projecting hinge pockets having a predetermined size and configuration for nested conforming reception in an associated inner panel upper and lower hinge pocket, whereby said nested upper and lower pockets define upper and lower integral door-half hinge portions adapted for connection by upper and lower pivot pins with respective upper and lower body-half hinges.

10. The window structure as set forth in claim 9 wherein each said inner panel hinge pocket comprises a pair of upper and lower horizontal end walls and a vertical side wall interconnecting said end walls, said pocket side wall being disposed parallel to and off-set inboard from said inner panel side flange;

each said outer panel hinge pocket comprising a pair of upper and lower horizontal end walls and a vertical side wall interconnecting its end walls;

whereby upon said inner and outer panels being assembled into a door structure, said outer panel pair of hinge pockets sized for nested conforming reception in their associated inner panel pair of hinge pockets with each said inner panel hinge pocket respective upper and lower end walls and side wall interior surfaces is in flush contact with respective upper and lower end walls and side wall exterior surfaces of an associated outer panel hinge-pocket.

11. A door structure for a vehicle comprising:

outer and inner door panels of plastic material, said inner panel integrally formed with first and second upright frame portions extending from a lower end to an upper end, an inner panel lower frame portion connecting said lower ends of said first and second frame portions and an inner panel horizontal waist frame portion connecting intermediate portions of said first and second frame portions, said first and second frame portions, said waist frame portion and said upper frame portion defining a window opening;

an inner panel upstanding intermediate frame portion extending from a lower end to an upper end connecting said lower frame portion and said waist frame portion, said intermediate frame portion having an inner wall disposed parallel to co-planer inner walls of said first and second frame portions, said intermediate frame portion inner wall positioned inboard therefrom about one-half the dimension between said first and second frame portion inner walls and said outer door panel;

said first and second frame portions having opposed first and second side walls each formed with mirror image L-section vertically disposed first and second rebates, said rebates defining co-planar first and second reveal flanges offset inboard from said door outer panel, and first and second parallel opposed fence flanges longitudinally spaced apart;

an inboard inverted U-shaped trim member having vertically extending first and second leg sections each fixedly received in an associated one of said first and second rebates defining therewith opposed first and second guide grooves, a window panel having vertical first and second side edges slidably received in an associated guide groove; and a manual window panel regulating mechanism comprising a bracket mounted on a lower edge of said window panel, said bracket rotationally supporting a window panel regulator having an inboard operating end and an outboard end adapted for locked engagement with said intermediate frame portion, said operating end adapted for rotation in a locking direction holding said window panel in a partially or fully raised position, and said operating end adapted for rotation in an opposite direction releasing said window panel for selected positioning in said window frame.

12. A door structure for a vehicle comprising:

a lower door panel of plastic material and an upper inverted U-shaped metal window frame member, said door panel integrally formed with first and second upright frame portions and an intermediate upright frame portion, said first and second frame portions, having co-planar inner walls, extending from a lower end portion to an upper end portion, a lower frame portion connecting said lower ends of said first and second upright frame portions and an upper waist frame portion connecting said upper ends of said first and second frame portions, said first and second upright frame portions, said waist frame portion and said upper frame portion defining a window opening;

said intermediate frame portion extending from a lower end to an upper end connecting said lower frame portion and said waist frame portion, said intermediate frame portion having an inner wall parallel to said first and second frame portion inner walls and offset outboard therefrom a dimension;

said first and second frame portions defining opposed vertically extending side walls having their inboard ends formed with mirror image L-sectioned rebates defining co-planer first and second reveal flanges offset inboard from said outer panel and first and second parallel opposed fence flanges;

said upper window frame member comprising vertically extending first and second leg sections, each said leg section fixedly received in an associated one of said first and second reveal flange and a leg flange, said window frame member having a channel section defining first and second opposed guide grooves, a window panel having vertical first and second side edges slidably received in an associated guide groove; and a manual window panel regulating mechanism comprising a bracket mounted on a lower edge of said window panel, said bracket rotationally supporting a window panel regulator having an inboard operating end and an outboard end adapted for locked engagement with said intermediate frame portion, said operating end adapted for rotation in a locking direction holding said window panel in a partially or fully raised position, and said operating end adapted for rotation in an opposite direction releasing said widow panel for selected positioning in said upper widow frame.

* * * * *